United States Patent [19]

Rohloff

[11] Patent Number: 4,486,055
[45] Date of Patent: Dec. 4, 1984

[54] DEVICE FOR COMPENSATING FOR RADIAL PLAY OF A BALL BEARING IN A BEARING BORE

[75] Inventor: Rolf Rohloff, Würzburg, Fed. Rep. of Germany

[73] Assignee: Siemens Aktiengesellschaft, Munich, Fed. Rep. of Germany

[21] Appl. No.: 158,738

[22] Filed: Jun. 12, 1980

[30] Foreign Application Priority Data

Jun. 30, 1979 [DE] Fed. Rep. of Germany ....... 2926541

[51] Int. Cl.³ .............................................. F16C 27/04
[52] U.S. Cl. ................................................... 384/535
[58] Field of Search ....... 308/184 R, 189 R, DIG. 11, 308/189 A, 207 A, 236, 193; 277/117

[56] References Cited

U.S. PATENT DOCUMENTS

| 3,738,719 | 6/1973 | Langner | 308/189 A |
| 3,940,192 | 2/1976 | Hägele | 308/189 A |
| 4,236,767 | 12/1980 | Feldle | 308/DIG. 11 |

FOREIGN PATENT DOCUMENTS 851865  10/1952  Fed. Rep. of Germany .

*Primary Examiner*—Lenard A. Footland

[57] ABSTRACT

Play between an axially pre-tensioned ball bearing assembly mounted on a rotating motor shaft and the bore of the motor's end shield, in which the bearing is received, is prevented by use of a disc having a formed-on, wedge-shaped rim, which is pressed into the space between the bearing's outer surface and the wall of the bore. Centering for the pretensioning spring can be provided by an oppositely protruding, wedge-shaped rim, also formed on the disc at the time of manufacture.

8 Claims, 4 Drawing Figures

DEVICE FOR COMPENSATING FOR RADIAL PLAY OF A BALL BEARING IN A BEARING BORE

BACKGROUND OF THE INVENTION

The present invention relates to a device for compensating the radial play of an antifriction ball bearing in a bearing bore. More particularly, the invention relates to placement of a disc in front of the ball bearing at the end face, there being an axially formed projection on the circumference which extends into the radial clearance and is fitted to the latter with a definite, matching radial pressure.

A device of this kind is described in German Pat. No. 851 865. There a ring-shaped intermediate member, deformable in the radial direction, is inserted into the space between the parts of a friction joint being connected. The radial dimension of the intermediate member is matched to the radial clearance in such a way that a plastic deformation of the intermediate member is brought about when the connection is made. In a particular embodiment, this device for compensating radial play of the friction joint consists of a substantially circular plate which is cut at the circumference to form ears which are bent up at a right angle to the flat central portion of the plate. The ears, arranged thus in a circle, are themselves curved and their concave sides face outward. In the assembly the curved ears are pressed into the space providing the radial play and the bulging, the wall thickness, and the width, as well as the spacing of the ears from each other, are all chosen, taking into account the magnitude of the clearance, in such a way that the desired radial pressure on the bearing is obtained.

It is an object of the present invention to provide a device compensating the above described radial play which is substantially simplified, both as to manufacture and as to installation.

SUMMARY OF THE INVENTION

The above defined problem is solved, in accordance with the invention, in a device of the type mentioned above for use in an axially pre-tensioned ball bearing, by providing a disc which has an axially formed-on (front-edge) rim, in the form of a wedge, directed toward the outer circumferential surface of the ball bearing and by pressing the wedge, by means of the axial pre-tensioning force, into the clearance between the ball bearing and the bore in which the bearing is inserted, in a direction such that the radial play present is compensated.

A device for compensating the radial play, designed according to the teachings of the invention, as a disc having a formed-on, wedge-shaped, outer rim, can be produced very simply as a one-piece injection molding which requires no additional handling and can be installed by simple insertion in the assembly of the ball bearings. The tip of the wedge is pressed axially into the clearance space to the depth required to offset the existing radial play, using the existing axial adjustment force. The disc and its formed-on wedge-shaped rim then adapts itself to the possibly variable play between the outer ring of the ball bearing and the bearing bore as a result of the action of the axial adjusting force which is divided at the incline of the wedge into an axial and a radial force component. Not only is the play caused by manufacturing tolerances cancelled due to the axial, off-setting force and the design of the disc, but a bearing seat which is free of play during operation is ensured, even though the magnitude of the bearing play should change. Such changes in play occur, for instance, when a rise in operating temperature brings about changes in dimension due to different coefficients of expansion in the material of the bearing bore, on the one hand, and the bearing, on the other. The axial adjustment force can be brought about not only by means of the usual, suitable axial adjustment spring but also by an electromagnetic force acting on a rotor in the axial direction, as is the case when sliding-armature motors are used.

In one particular embodiment of the invention, the wedge on the disc is provided with an asymmetrical cross section, having a first, radially outer, wedge surface which lies parallel to the bearing bore and a second, radially inner, wedge surface which is conical, being set at an inclined angle to the outer circumferential surface of the ball bearing. This results, on the one hand, in good contact guidance of the wedge disc in to the bearing bore and, on the other hand, in a reliable, wedging action which prevents undesirable radial play.

If, in addition, the disc is symmetrically designed, with first and second wedge-shaped rims formed on and extending in opposite axial directions, the compression spring which provides the axial force and sets the bearing is centered in a simple manner at the time of assembly, and it is not necessary to select the side of the disc which is inserted first.

Advantageously, the disc for compensating the radial play can, at the same time, serve as a dust cover for the ball bearing. In this case the diameter of the hole in the disc is made slightly larger than the diameter of the shaft (or the central hole in the bearing) in order to protect open parts of the ball bearing against the penetration of foreign bodies. In a ball bearing serving as an antifriction bearing, the disc is provided with clearance so that it cannot rub against the revolving inner ring of the ball bearing.

To insure that the disc, with its formed-on wedge-shaped rim, can adapt to the differing radial positions of various points of contact between the inclined wedge surface and the outer circumferential surface of the antifriction bearing and to allow the needed degree of radial play for compensation, a certain amount of elastic resiliency in the material of the disc and wedge is advantageous, especially if the revolving rim of the bearing is of the closed type. According to another embodiment of the invention, the spring rate of the disc with the formed-on wedge-shaped rim can be fixed to optimally match the material of the disc and the axially pressing axial force by providing at least one circumferential rim of the disc with slot-shaped axial cutouts.

DETAILED DESCRIPTION OF THE INVENTION

Figure 1:
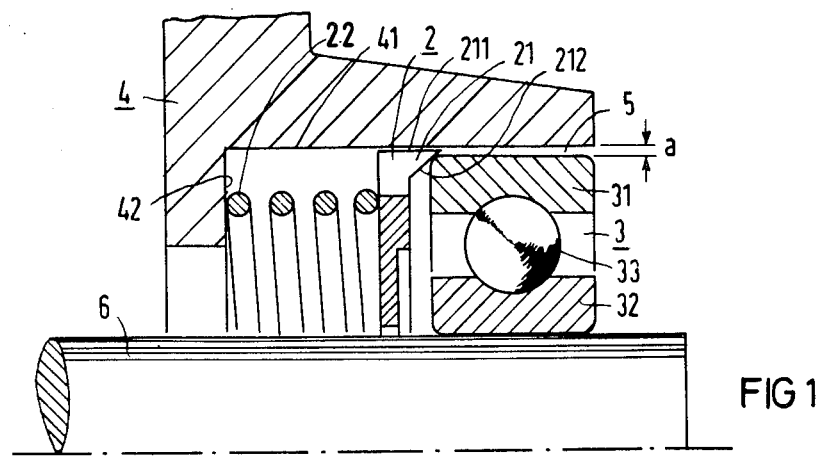
FIG. 1 is a side view in partial cross-section, of an asymmetrical disc, according to the teachings of the invention.
Figure 2:
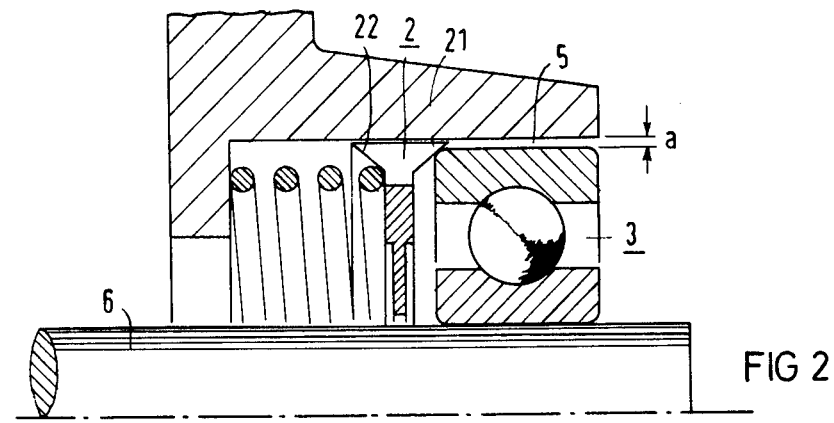
FIG. 2 is a side view in partial cross-section of a symmetrical disc, according to the teachings of the invention.

As shown in FIGS. 1 and 2, a motor shaft 6 is rotatably supported in a bearing bore 41 of an end shield 4 via an antifriction (ball) bearing 3 having an inner ring 32, plural balls 33, and an outer ring 31. To prevent the development of noise due to bearing play between inner ring 32, balls 33, and outer ring 31, respectively, the bearing is usually pre-tensioned or adjusted (off-set) by an axial force which causes an axial displacement between the outer bearing ring and the inner bearing ring. To pre-tension the ball bearing and, therefore, to avoid the development of noise resulting from bearing play between the outer ring and the inner ring, a coil spring 1 is provided, which, in the present case, is seated (at the left end) against a shoulder 42 of end shield 4 in bearing bore 41.

A further reason for the development of noise has been found to be radial play between the outer circumferential surface, i.e., the outer surface of ring 31 of ball bearing 3, and bearing bore 41 of end bell 4. This bearing play is defined herein as the radial spacing a, in FIGS. 1 and 2.

According to the invention, this radial play can be prevented by a disc 2 having an axially projecting, formed-on rim 21, which takes the form of a wedge. Wedge 21 is inserted, pointing toward outer ring 31 of ball bearing 3, between the right hand end of axial compression spring 1 and the outer ring 31 of ball bearing 3. Inner ring 32 is secured on motor shaft 6, as by friction, and wedge 21 is pressed, by the axial pretensioning force of the axial compression spring 1, into clearance space 5 between ball bearing 3 and bearing bore 41 to compensate for the prevailing radial play a.

Disc 2 advantageously serves, at the same time, as a dust cover for ball bearing 3. This is brought about by making the diameter of the inner hole of disc 2 is slightly larger than the diameter of shaft 6, so that the disc extends close to the outside surface of the shaft. Disc 2 can be undercut in the vicinity of inner ring 32 to be at a distance from inner ring 32 so that rubbing contact with the inner ring 32 is prevented.

FIG. 1 shows a disc on which the wedge-shaped rim is formed only on the right hand surface. FIG. 2 shows a symmetrical design of disc 2 which has similarly formed-on, wedge-shaped rims on both surfaces of the disc.

In the embodiment shown in FIG. 2, axial compression spring 1 is centered by the wedge on the left end face of disc 2, while, at the same time, radial play is prevented by the wedge on the right hand face of the disc. A further advantage is obtained from the symmetrical design of the disc of FIG. 2: it is unnecessary to orient the disc in a particular way during assembly for slipping it on.

It is advantageous to provide the single rim wedge of FIG. 1 and the double rim wedges of FIG. 2 with an asymmetrical cross section in which a first, radially outer, wedge surface 211 runs parallel to the inner surface of bearing bore 41, and a second, radially inner, wedge surface 212 is conical, having an inclined inner surface at an angle to the outer circumferential surface (of outer ring 31) of ball bearing 3.

Figures 3, 4:
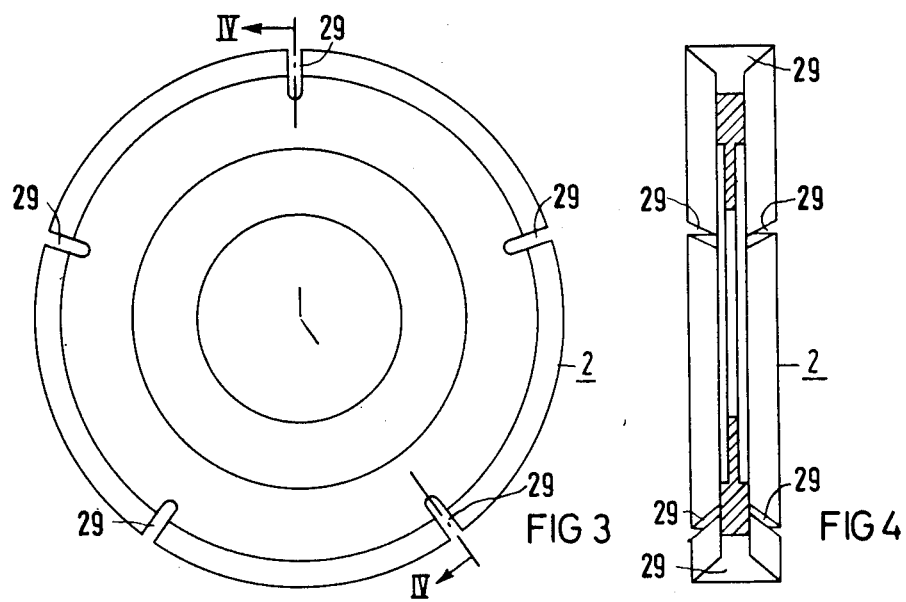
FIG. 3 is a plan view of a disc having a rim which is interrupted at the circumference by slot-shaped cutouts.
FIG. 4 is a view, in cross-section, of the disc of FIG. 3, taken along lines IV—IV.

As can be seen, particularly from FIGS. 3 and 4, the circumferences of the circular wedge-shaped rims on both end faces are provided with thin, slot-shaped cutouts 23 to 27. By varying the number, spacing, and design of these interruptions, the spring rate of the wedge disc can be varied in a controlled way, making an optimum match between the material of the wedge disc and the axial spring force of axial compression spring 1 possible.

What is claimed is:

1. In a disc for use in front of an end face of a ball bearing assembly in a bearing bore for compensating radial play resulting from radial clearance between the outer circumference of the bearing assembly and the bore, the disc having a projection extending axially into the radial clearance, the improvement, intended for use with an axially spring-loaded bearing assembly, in which:

the projection comprises a wedge-shaped rim formed on the periphery of the disc which, when placed in contact with the outer circumference of a bearing assembly and pressed into the clearance between the outer circumference of the bearing assembly and a bearing bore in which the bearing assembly is placed, bears on the outer circumference of the bearing assembly and prevents radial play between the bearing assembly and the bore.

2. In a disc in accordance with claim 1, the further improvement in which:

the wedge-shaped rim is asymmetrical in cross-section, having a radially outer surface lying substantially parallel to the bearing bore and a conical, inner surface providing an inclined angle of attack towards the outer circumference of the bearing assembly.

3. In a disc in accordance with claim 2, the further improvement comprising:

a second axially projecting rim formed on the periphery of the disc and extending in a direction opposite to that of the wedge-shaped rim.

4. In a disc in accordance with any one of claims 1–3, the further improvement in which the radially outer surface of the wedge-shaped rim has a circumference and further comprising:

slot-shaped cutouts in the circumference.

5. In a disc in accordance with claim 4, the further improvement in which:

the disc has an inner diameter slightly larger than the central diameter of a bearing assembly with which it may be used and a portion on the side of the disc which will face the bearing assembly is cut away.

6. In a disc in accordance with claim 5, the further improvement in which the disc and the wedge-shaped rim comprise one piece of injection-molded plastic.

7. In a disc in accordance with claim 4, the further improvement in which the disc comprises elastic material.

8. In a disc in accordance with claim 4, the further improvement in which the disc and the wedge-shaped rim comprise one piece of injection-molded plastic.

* * * * *